Nov. 1, 1938.　　　　E. F. PAWSAT　　　　2,135,218
SUPPORT FOR MUDGUARDS
Filed March 6, 1937
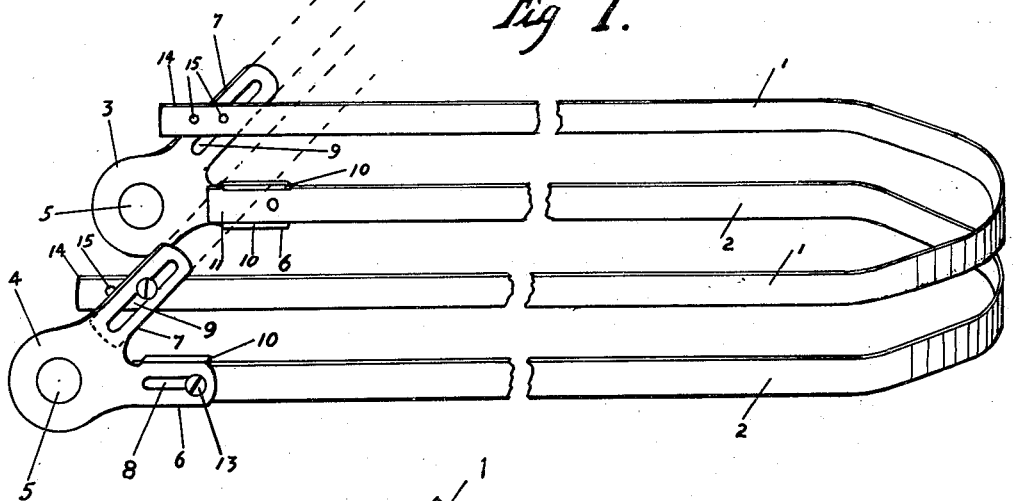
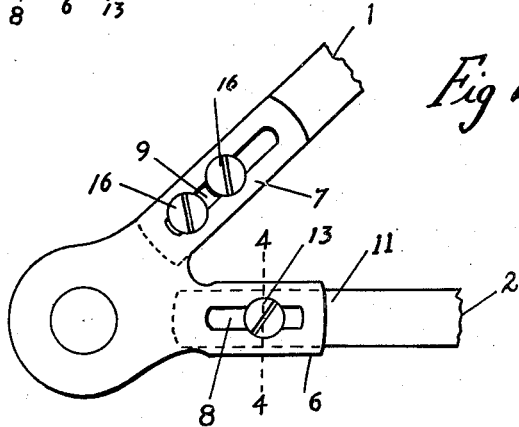
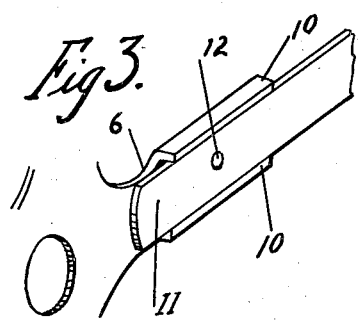
Inventor,
Ewald F. Pawsat,
By Arthur Heward,
Attorney.

Patented Nov. 1, 1938

2,135,218

UNITED STATES PATENT OFFICE 2,135,218

SUPPORT FOR MUDGUARDS

Ewald F. Pawsat, Maysville, Ky., assignor to Wald Manufacturing Company, Incorporated, a corporation of Kentucky Application March 6, 1937, Serial No. 129,406

1 Claim. (Cl. 280—152.1)

The present invention relates to supports for mud guards for bicycles and similar vehicles.

The principal object of the present invention is to provide a mud guard brace for a bicycle or similar vehicle wherein suitable adjustments may be made so as to adapt the support to mud guards on vehicles of varying construction and dimensions. Supports for mud guards of the type mentioned have heretofore been designed specifically to fit the vehicle for which intended. It is thus necessary for the manufacturer to provide supports of varying size and construction for the different vehicles of his manufacture. Also for the replacement of a damaged mud guard support, it has been necessary heretofore to obtain one specifically constructed and dimensioned to meet the requirements of the vehicle upon which the replacement is to be made. This requirement for a plurality of specifically constructed and sized mud guard supports is overcome by my present invention.

A further object of the invention is to provide a mud guard support of the type mentioned wherein arrangement is made for adjustability of a plurality of standards in such manner that the standards may be packed flat for transportation.

Other objects of my invention will appear from the following detailed description thereof.

In the drawing:

Figure 1 is a perspective of a mud guard support constructed in accordance with this invention.

Figure 2 is an enlarged elevation of the adjustable features.

Figure 3 is a perspective of the adjustable portion of one of the standards.

Figure 4 is a section on line 4—4 of Figure 2.

The numerals 1 and 2 indicate respectively the upper and lower U-shaped standards of a rear mud guard support for a bicycle or similar vehicle. The open ends of the standards 1 and 2 are arranged to be secured to brackets 3 and 4 which have openings 5 by means of which they are adapted to fit on and to be secured to the rear axle of the vehicle. The brackets 3 and 4 are each provided with a lower arm 6 and an upper arm 7. The arms 6 are provided with slots 8 and arms 7 with slots 9. The arms 6 are furthermore provided with upper and lower inturned flanges 10—10 which together with the arms form channels adapted to receive the ends 11 of the legs of the standards 2. The ends 11 are provided with threaded perforations 12 which register with the slots 8 in the arms 6. Set screws 13 are arranged to be screwed into the perforations 12 through the slots 8, as clearly shown in Figures 1 and 2.

The ends 14 of the legs of standard 1 are each provided with two threaded perforations 15 into which screws 16—16 are adapted to engage through slots 9. The slots 9, as clearly shown in Figures 1 and 2 are considerably longer than the displacement of the screws 15 from each other.

From the foregoing description, it will be seen that the standards 1 and 2 may be adjusted in their assembly with the arms 6 and 7 of the brackets 3 and 4. In case of the arms 2 the screws 13 are loosened, whereupon the legs of the standard are permitted to slide in the channels, the screws 13 moving longitudinally in the slots 8. When suitable adjustment has been attained the screws 13 are again tightened. In the case of the standard 1 the screws 16—16 are loosened whereupon the legs of the standard are permitted to slide along the arms 7, the screws moving longitudinally in the slot 9. When suitable adjustment is attained these screws are again tightened. Furthermore, it will be noted that by removing one of the screws 16 from each leg of the standard 1, said standard may be rotated with respect to the arm 7, the remaining screws 16 serving as pivots upon which the standard rotates. The standard 1 may thus be rotated into a position substantially parallel to the standard 2, after which the remaining screws 16 may be tighened if desired to retain the standards in flat relation. In this position, the support is adapted for convenient packing and transportation.

From the foregoing it will be seen that a mud guard support constructed in accordance with the present invention is adapted to ready adjustability through a considerable range to meet the requirements of vehicles of various size and construction. It thus becomes necessary for the manufacturer, or for the jobber handling replacement units, to manufacture or stock but one type of support, thus contributing greatly to the convenience and economy of construction and handling.

Having thus fully described my invention, what I claim as new and desire to obtain by Letters Patent is:

A device of the character specified comprising a pair of brackets, a pair of slotted arms on each of said brackets, flanges on the lower arms of each bracket to form channels therewith, a pair of U-shaped standards, the ends of the legs of one of said standards being arranged to slide respectively in the channels in said lower arms, a threaded perforation in each leg of said standard near its end, set screws arranged to screw into said perforations through the slots in said lower arms, a pair of threaded perforations in each leg of the other standard near its end, the displacement of said perforations being less than the length of the slots in the upper arms, and a pair of set screws arranged to screw into the perforations in each leg through the slots in said upper arms.

EWALD F. PAWSAT.